US009352471B1

(12) United States Patent
Velazquez et al.

(10) Patent No.: US 9,352,471 B1
(45) Date of Patent: May 31, 2016

(54) SUBSTRATE GRIPPER APPARATUS AND METHODS (71) Applicant: Applied Materials, Inc., Santa Clara, CA (US)

(72) Inventors: Edwin Velazquez, Union City, CA (US); Gee Hoey, San Jose, CA (US); Jim K. Atkinson, Los Gatos, CA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 14/602,094

(22) Filed: Jan. 21, 2015

(51) Int. Cl.
*B66C 1/42* (2006.01)
*B25J 15/00* (2006.01)

(52) U.S. Cl.
CPC .................................. *B25J 15/0028* (2013.01)

(58) Field of Classification Search
CPC .............. B25J 15/0028; B25J 15/0033; B25J 15/0038; B25J 15/0253; B25J 15/0266; B25J 11/0095; H01L 21/68707; H01L 21/67742; H01L 21/67778
USPC ................ 294/119.1, 207, 902, 213; 414/941
See application file for complete search history.

(56) References Cited

U.S. PATENT DOCUMENTS

| | | | | |
|---|---|---|---|---|
| 1,807,360 | A * | 5/1931 | Wehr | B65H 19/126 294/106 |
| 4,428,710 | A * | 1/1984 | Grisebach | B25J 9/04 414/590 |
| 4,586,743 | A | 5/1986 | Edwards et al. | |
| 4,784,422 | A * | 11/1988 | Jones | B25J 15/0028 294/106 |
| 5,201,501 | A * | 4/1993 | Fassler | B23Q 1/76 269/156 |
| 5,700,046 | A * | 12/1997 | Van Doren | H01L 21/68707 294/119.1 |
| 5,997,064 | A * | 12/1999 | Orita | B66C 1/445 294/119.1 |
| 6,027,574 | A | 2/2000 | Fishkin et al. | |
| 6,156,124 | A | 12/2000 | Tobin | |
| 6,322,312 | B1 | 11/2001 | Sundar | |
| 6,386,609 | B1 | 5/2002 | Gorzman | |
| 6,474,712 | B1 | 11/2002 | Gorzman et al. | |
| 6,520,315 | B1 | 2/2003 | Sugarman et al. | |
| 6,575,177 | B1 | 6/2003 | Brown et al. | |
| 6,592,324 | B2 * | 7/2003 | Downs | B25J 15/0253 294/104 |
| 6,626,476 | B1 | 9/2003 | Gorzman et al. | |
| 7,374,391 | B2 | 5/2008 | Rice et al. | |
| 7,718,011 | B2 | 5/2010 | Fishkin et al. | |
| 7,980,255 | B2 | 7/2011 | Achkire et al. | |
| 8,616,599 | B2 * | 12/2013 | Motonaga | B25J 15/0004 294/119.1 |
| 2009/0196724 | A1 | 8/2009 | Chen et al. | |
| 2011/0020103 | A1 * | 1/2011 | Shonai | B65G 47/90 414/783 |
| 2013/0081301 | A1 | 4/2013 | Gouk et al. | |
| 2014/0110959 | A1 * | 4/2014 | Urabe | H01L 21/68707 294/207 |
| 2015/0287627 | A1 * | 10/2015 | Yamasaki | H01L 21/67144 294/119.1 |

OTHER PUBLICATIONS

Gorzman et al., U.S. Appl. No. 10/255,325, titled "Gripper for Supporting Substrate in a Vertical Orientation," filed Sep. 26, 2002.
Velazquez et al., U.S. Appl. No. 14/593,841, titled "Substrate Holder Assembly, Apparatus, and Methods," filed Jan. 9, 2015.

* cited by examiner

*Primary Examiner* — Gabriela Puig
(74) *Attorney, Agent, or Firm* — Dugan & Dugan, PC (57) ABSTRACT

A substrate gripper apparatus is provided. Substrate gripper apparatus includes a body, a first slide member moveable relative to the body, a first finger mounting member coupled to the first slide member, a first lower finger coupled to the first finger mounting member, and a first pivoting finger coupled to the first finger mounting member. First pivoting member may impose a force on a substrate due to gravity. Methods of operating the substrate gripper apparatus as well as other aspects are provided.

19 Claims, 6 Drawing Sheets

SUBSTRATE GRIPPER APPARATUS AND METHODS

FIELD

The present invention relates generally to electronic device manufacturing, and more particularly to substrate grippers.

BACKGROUND

Within electronic device manufacturing, a planarization process may be used to remove various layers or films, such as silicon dioxide, silicon nitride, copper, or the like from a substrate (e.g., a patterned substrate). Planarization may be accomplished using a chemical mechanical polishing (CMP) process by applying abrasive slurry between a polishing pad and the substrate surface to be polished (e.g., planarized).

Once the CMP process is completed on the substrate, one or more post-planarization cleaning processes may take place thereon. In some instances, post-CMP processing includes cleaning within a tank of liquid (or a bath) followed by, and possibly even preceded by, a rinsing bath (e.g., within a separate tank) to achieve desirable cleaning levels. Upon being removed from the rinsing bath, a drying apparatus (e.g., a Marangoni dryer) may be used to blow off bath fluid from a surface of the substrate.

During one or more of the cleaning processes, the substrates (e.g., substrates) may be transported and gripped by a gripper mechanism. However, existing grippers suffer from various problems. Accordingly, improved gripper apparatus adapted to grip and move substrates are sought.

SUMMARY

In one aspect, a substrate gripper apparatus is provided. The substrate gripper apparatus includes a body, a first slide member moveable relative to the body, a first finger mounting member coupled to the first slide member, a first lower finger coupled to the first finger mounting member, and a first pivoting finger coupled to the first finger mounting member.

In another aspect, a substrate gripper apparatus is provided. The substrate gripper apparatus includes a body, a first slide member and a second slide member moveable towards and away from each other, a first finger mounting member coupled to the first slide member, a second finger mounting member coupled to the second slide member, a first lower finger coupled to a lower end of the first finger mounting member, a second lower finger coupled to a lower end of the second finger mounting member, a first pivoting finger coupled to an upper end of the first finger mounting member and pivotable about a first pivot axis, the first pivoting finger including surface support features and edge support features, and a second pivoting finger coupled to an upper end of the second finger mounting member and pivotable about a second pivot axis, the second pivoting finger also including surface support features and edge support features.

In yet another aspect, a method of operating a substrate gripper apparatus is provided. The method includes providing a first slide member (e.g., that is linearly moveable), a first finger mounting member coupled to the first slide member, and a first lower finger and a first pivoting finger coupled to the first finger mounting member, moving the first slide member to cause the first lower finger and the first pivoting finger to contact an edge of a substrate, and providing, with the first pivoting finger, a gripping force due to gravity on the substrate.

Other features and aspects of the present invention will become more fully apparent from the following detailed description of example embodiments, the appended claims, and the accompanying drawings.

BRIEF DESCRIPTION OF THE DRAWINGS

The drawings, described below, are for illustrative purposes only and are not necessarily drawn to scale. The drawings are not intended to limit the scope of the invention in any way.

DESCRIPTION

A substrate gripper apparatus is provided in accordance with one or more embodiments of the invention. Substrate gripper apparatus may be part of a substrate handler of a substrate cleaning module, for example. Substrate gripper apparatus has utility for accepting substrates from one location and gripping them as they are moved to another location. In particular, the substrate gripper apparatus may receive substrates from a substrate holder of a substrate cleaning module (e.g., including a rinsing bath), move the substrate to a handoff location, and position a substrate for acceptance by another robot. Substrate gripper apparatus, in one aspect, is clean, in that any particles generated by mechanical components thereof are substantially retained inside the substrate gripper apparatus. Thus, the substrate gripper apparatus minimizes particulate contamination of the substrate manufacturing environment.

Referring now to FIGS. 1-3A, various views of the substrate gripper apparatus 100 are shown according to a first embodiment of the present invention. The substrate gripper apparatus 100 comprises a body 102, and a first slide member 104 and second slide member 106 moveable towards and away from each other, and which may move linearly relative to the body 102, and may be synchronized. First slide member 104 and second slide member 106 may be slide blocks that slide on linear bearings or other suitable bearing surfaces or mechanisms formed on, or connected to, the body 102.

Figure 1:
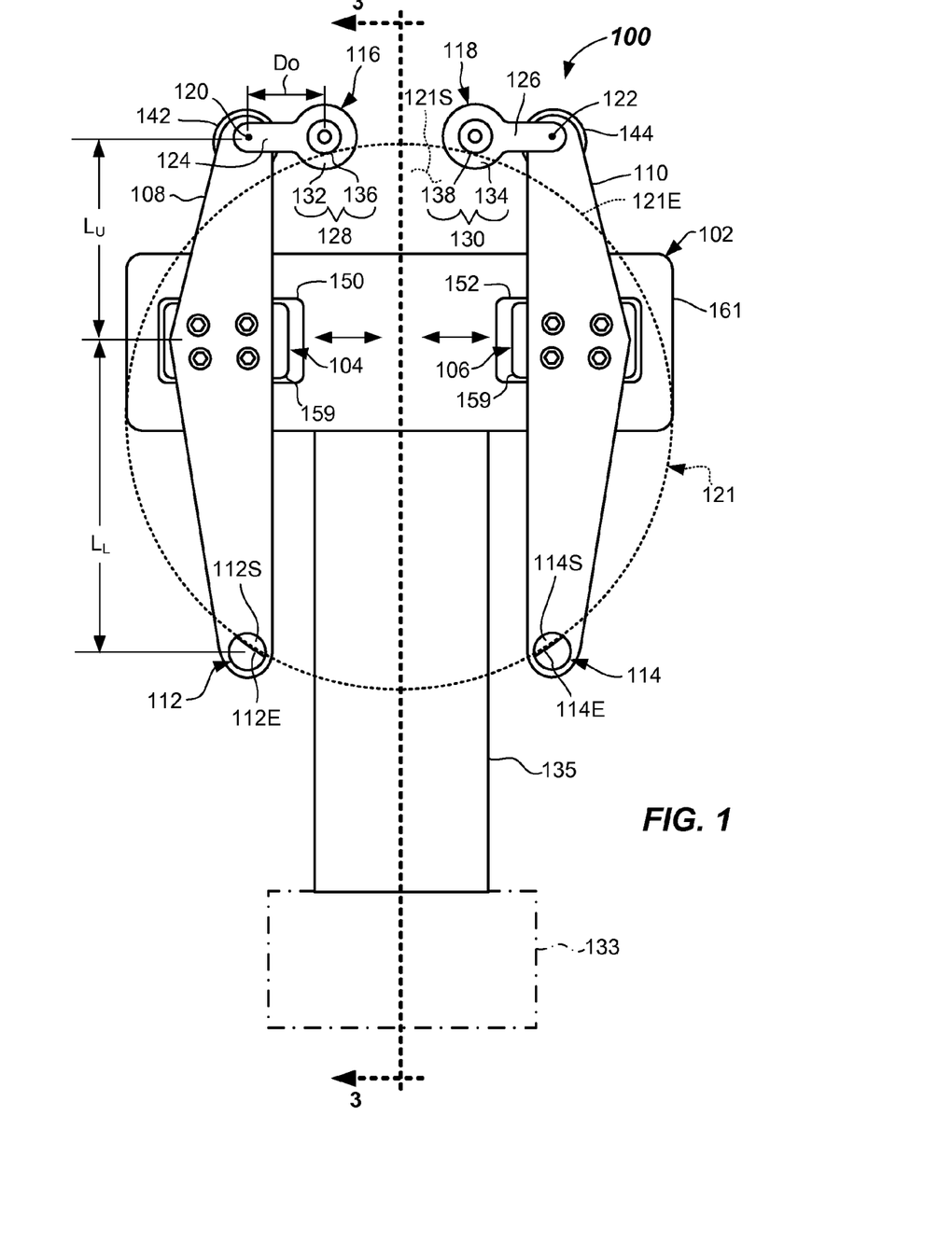
FIG. 1 illustrates a front view of a substrate gripper apparatus according to one or more embodiments.
Figure 2:
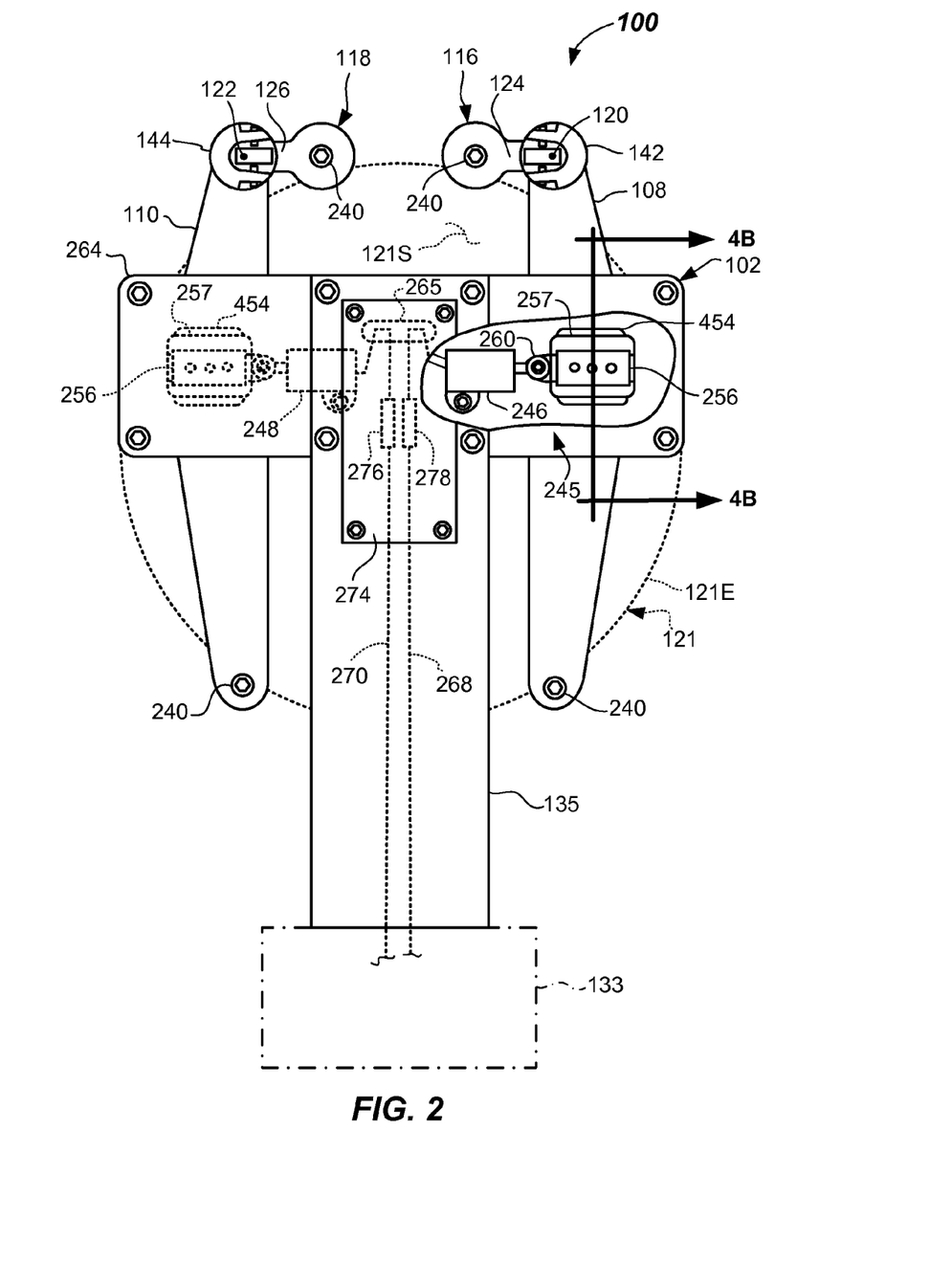
FIG. 2 illustrates a rear view with a partial cutout of a substrate gripper apparatus according to one or more embodiments.
Figure 3A:
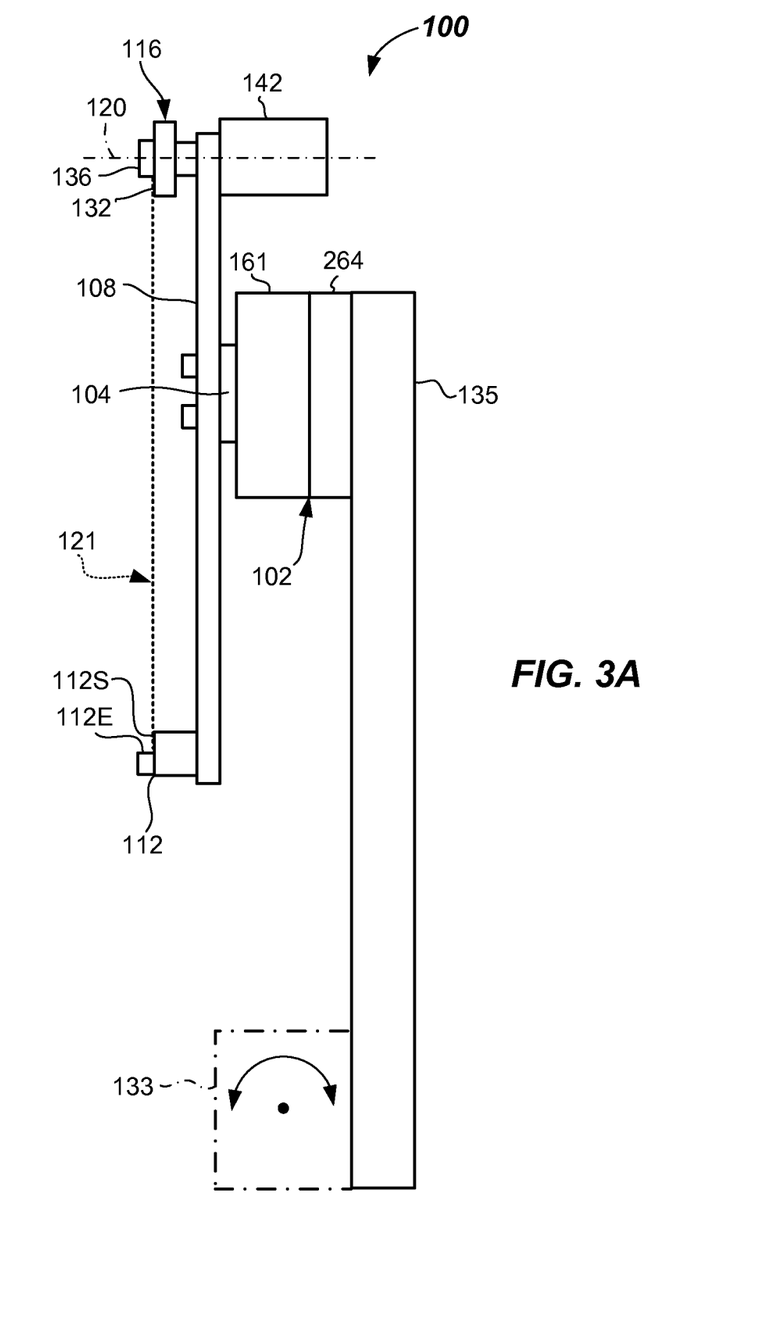
FIG. 3A illustrates a side view of a substrate gripper apparatus according to one or more embodiments.

The depicted substrate gripper apparatus 100 comprises a first finger mounting member 108 coupled to the first slide member 104, and a second finger mounting member 110 coupled to the second slide member 106. First and second finger mounting member 108, 110 may be coupled to respective first slide member 104 and second slide member 106 by fasteners (e.g., bolts or screws, or the like) or they may be coupled by being made integral with the first slide member 104 and second slide member 106. Each of the first and second finger mounting members 108, 110 includes a first end (e.g., lower end) extending below the mounting location to the respective first and second slide members 104, 106, and a second end (e.g., upper end) extending above the mounting location, as shown.

A first lower finger 112 may be coupled to a first end (e.g., lower end) of the first finger mounting member 108, and a second lower finger 114 may be coupled to a first end (e.g., lower end) of the second finger mounting member 110. The first and second lower fingers 112, 114 may be coupled to the first and second finger mounting members 108, 110 by fasteners 240 (e.g., bolts, screws, or the like). The first and second lower fingers 112, 114 may include substrate surface support features, such as lower surface support features 112S, 114S that may be configured and adapted to contact, register, and support a planar surface of a substrate 121, as shown. First and second lower fingers 112, 114 may include substrate edge support features, such as lower edge support features 112E, 114E that may be configured and adapted to contact, register, and support a radial edge of a substrate 121, as shown.

On an upper end, a first pivoting finger 116 may be coupled to the first finger mounting member 108, and a second pivoting finger 118 may be coupled to an upper end of the second finger mounting member 110. Each of the first and second pivoting fingers 116, 118 are pivotable in operation about respective first and second pivot axes 120, 122. One or more embodiments may include a first pivot arm 124 and a second pivot arm 126. Each of the first and second finger pivot arms 124, 126 extend generally laterally from the respective first and second pivot axes 120, 122. First and second pivoting fingers 116, 118 may extend towards each other from their respective first and second pivot axes 120, 122.

In more detail, each of the pivoting fingers 116, 118 may include support features 128, 130 that are offset from the respective pivot axes 120, 122. Support features may include surface support features, such as first and second surface supports 132, 134 configured and adapted to contact and receive a front or back planar surface 121S of the substrate 121, and edge support features, such as first and second edge supports 136, 138 configured and adapted to contact and support a radial edge 121E of the substrate 121. The first and second surface support features 132, 134 may be coupled, respectively, to the first and second finger pivot arms 124, 126, and coupled also to the first and second edge support features 136, 138 that may extend from the first and second surface support features 132, 134.

As shown, the first and second surface supports 132, 134 may be configured to support the substrate 121 when the substrate gripper apparatus 100 is oriented horizontally, such as when the substrate gripper apparatus 100 is positioned at a handoff location to handoff a substrate 121 to another robot. The first and second surface supports 132, 134 may each include a support surface that extends generally perpendicularly from the first and second edge supports 136, 138. First and second surface supports 132, 134 may extend to at least about 5 mm from an outside edge (e.g., the edge contacting the radial edge 121E) of the first and second edge supports 136, 138. In some embodiments, the first and second surface supports 132, 134 may extend to between about 5 mm to about 25 mm from the outside edge. The first and second surface supports 132, 134 may include a semi-circular profile as shown, and the first and second surface supports 132, 134 may comprise a planar surface on which the substrate 121 may rest and be supported.

As shown, the first edge support 136 and second edge support 138 may be configured such that they will contact the radial edge of the substrate 121 at an offset distance "Do" that is offset from the respective pivot axes 120, 122. Offset distance "Do" may be between about 10 mm and about 100 mm, in some embodiments. Other offset distances may be used. The goal of the offset is to have a center of gravity of the first pivoting finger 116 (and second pivoting finger 118) near the contact location with the first and second edge supports 136, 138 when in a vertical orientation. First and second edge supports 136, 138 may be circular pucks including a cylindrical outer surface adapted to contact the radial edge 121E. First and second edge supports 136, 138 may be attached to the body of the pivoting fingers 116, 118 by fasteners 240, such as bolts, screws, or the like. First and second edge supports 136, 138 may be made from a soft polymer material, such as a thermoplastic polymer. One suitable material is a polyether ether ketone material. First and second edge supports 136, 138 may have a diameter of between about 10 mm and about 40 mm, and about 18 mm in some embodiments and a height from the first and second surface supports 132, 134 of at least about 1 mm, and about 6 mm, for example. Other materials and sizes may be used.

Figure 3B:
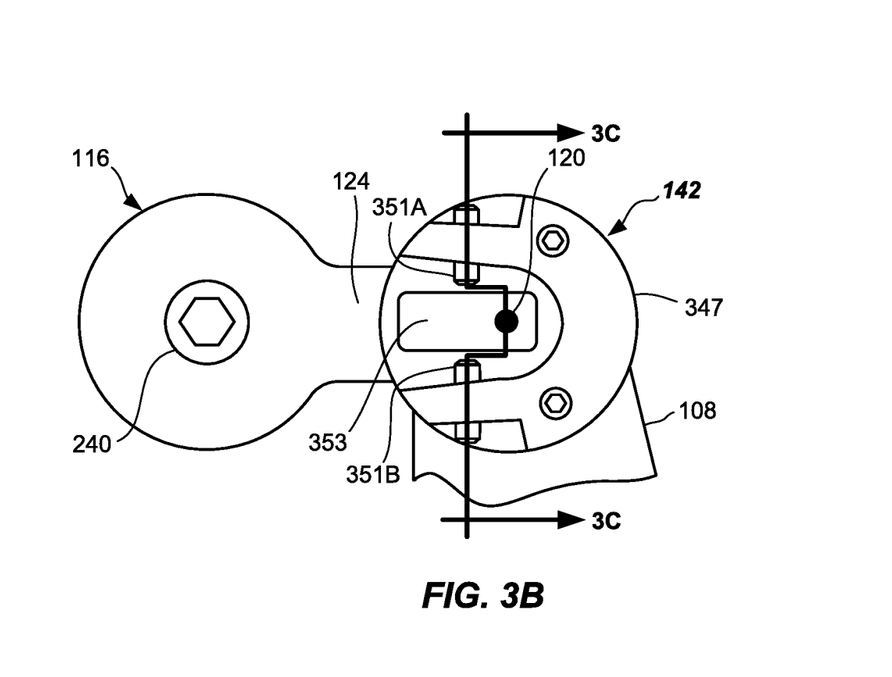
FIG. 3B illustrates an end view of a pivot assembly of a substrate gripper apparatus according to one or more embodiments.
Figure 3C:
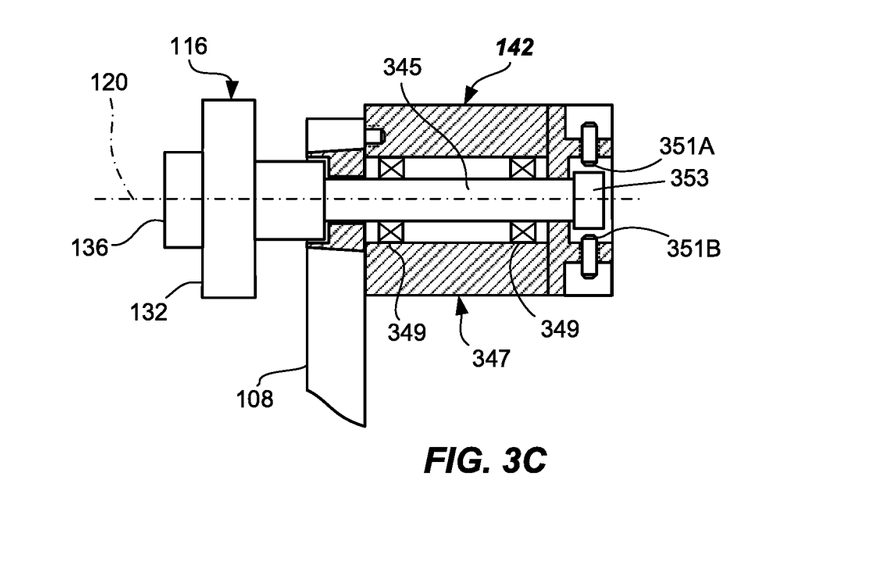
FIG. 3C illustrates a cross-sectioned side view of a pivot assembly of a substrate gripper apparatus taken along section line 3C-3C of FIG. 3B according to one or more embodiments.

Each of the first and second pivoting fingers 116, 118 may be coupled to a pivot assembly 142, 144. The pivot assembly 142 is shown in FIGS. 3B and 3C and operates to support a shaft 345 coupled to the pivoting finger 116. The shaft 345 may be rotationally mounted to the pivot housing 347 by one or more bearings 349. Pivot housing 347 may be coupled to the first finger mounting member 108, by fasteners (e.g., bolts, screws, or the like). Rotation of the pivoting finger 116 may be limited to defined clockwise and counterclockwise rotations. The limits may be adjustable, and may be provided by one or more stops 351A, 351B that engage with lever 353. Lever 353 may be rigidly mounted on, or integral with, shaft 345 and rotates therewith. Stops 351A, 351B may be set screws that allow adjustment of an amount of clockwise and counterclockwise rotation of the pivoting finger 116 within rotational limits. The pivot assembly 144 may be identical to pivot assembly 142.

In some embodiments, the substrate gripper apparatus may, at times, be positioned in a horizontal orientation, and at other times be positioned in a vertical orientation (shown in FIGS. 1-3A). In the vertical orientation, the first slide member 104 and second slide member 106 may be moved apart from one another to accept a substrate 121. The first slide member 104 and second slide member 106 may be moved apart (and towards each other) a distance under the action of one or more actuators (e.g., first and second actuators 246, 248).

In some embodiments, hard or soft stops may be provided to limit an extent that the first slide member 104 and second slide member 106 may move apart and/or together. For example, first slide member 104 and second slide member 106 may be received in first and second pockets 150, 152, and may only open so far until contact with an outside edge of the first and second pocket 150, 152 is made. The substrate 121 may then be placed onto the surface support features 132, 134 of the first and second pivoting fingers 116, 118 and onto the surface support features 112S, 114S of the first and second lower fingers 112, 114. Once positioned, the first slide member 104 and second slide member 106 may be closed via action of the one or more actuators (e.g., first and second actuators 246, 248), which may bring the edge support features (e.g., 112E, 114E, 136, 138) in contact with the radial edge 121E of the substrate 121.

The substrate gripper apparatus 100 may then be transitioned from the vertical orientation to a horizontal (upright) orientation in some embodiments. Transitional rotation may be provided via the action of a rotation mechanism 133, which may be coupled to the riser 135, which is in turn coupled to the body 102 of the substrate gripper apparatus 100. Upon moving the first slide member 104 and second slide member 106 towards each other a vertical orientation (closing), the first and second pivoting fingers 116, 118 may contact the radial edge 121E of the substrate 121, may pivot upward slightly, and provide a gripping force due to the force of gravity. In particular, the first and second edge support features 136, 138 come into contact with, and apply the gripping force, to the radial edge 121E of the substrate 121. This gripping force pinches the substrate 121 between the first and second pivoting fingers 116, 118 and the first and second lower fingers 112, 114, and, thus, holds the substrate 121. In some embodiments, the moment that is provided by each of the first and second pivoting fingers 116, 118 on the substrate 121 may be greater than about 0.01 in-lbs., or even between about 0.05 and about 1 in-lbs., and about 0.18 in-lbs. in some embodiments.

In operation, the first and second slide members 104, 106 may be linearly moveable by an actuation assembly 245 including one or more actuators (e.g., first actuator 246 and second actuator 248). The first and second actuators 246, 248 may be any suitable type of actuator, such as an air cylinder actuator, linear electric actuator, hydraulic actuator, or the like. Other suitable actuators, even rotary actuators, may be adapted to use. However, the motion of the actuators 246, 248 should be synchronized, i.e., substantially equal upon opening and closing. The linear constraints to movement of the first slide member 104 and second slide member 106 may be provided by any suitable slide bearing assembly construction.

Figure 4A:
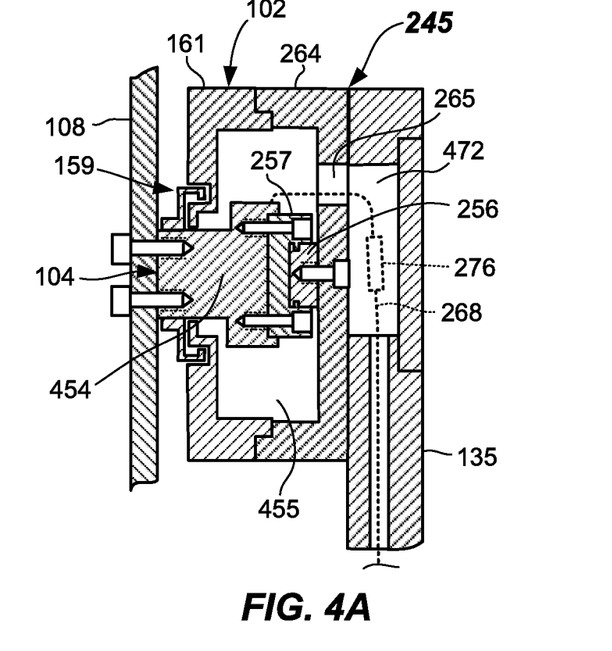
FIG. 4A illustrates a partial side cross-sectioned view of a substrate gripper apparatus illustrating construction of a first slide member according to one or more embodiments.

One example slide bearing construction is shown in FIG. 2 and in partial cross-section in FIG. 4A. First slide member 104 shown includes a frontal member 454 coupled to the first finger mounting member 108 and backing member 256. Backing member 256 may be rigidly fastened to a base 264 of the body 102, such as by fasteners (e.g., bolts, screws, or the like). Base 264 and cover 161 may form the body 102, which may include a step interconnection between them to minimize particle escape from a chamber 455 formed by them. Frontal member 454 is able to freely slide laterally, as shown, relative to the backing member 256. Frontal member 454 may be coupled to a bearing component 257. Bearing component 257 may include bearing features that complement bearing features included on backing member 256. Bearing features may be engaged with one another to accommodate linear relative sliding motion there between. Each of the bearing features may be dimensioned so as to provide a close sliding fit and provide ease of linear sliding motion. A seal 159 (e.g., a labyrinth seal as shown in FIGS. 1 and 4A) may be provided between the cover 161 and the frontal member 454, which includes a torturous path to minimize generated particle escape.

As shown in FIGS. 2 and 4A, the frontal members 454 may be coupled to ends 260 (e.g., spherical rod ends or the like), which may be provided on an end of a shaft of each the first and second actuators 246, 248. Other types of connectors suitable for attachment of the actuators 246, 248 to the frontal members 454 may be used. Optionally, ends 260 may be coupled to bearing components 257. Driving the frontal members 454 (or optionally, the bearing components 257) with the first and second actuators 246, 248 opens and closes the first and second finger mounting members 108, 110.

The cover 161 may be coupled to the base 264, such as by fasteners (e.g., bolts, screws, or the like) to form the chamber 455, and to cover the internal components of the substrate gripper apparatus 100 contained therein. Cover 161 may be configured and operative to contain any particles generated by movement of the actuation assembly 245 therein. Likewise, a seal 159 (FIGS. 1 and 4A) may be provided between the first slide member 104 and the body 102 to catch and/or retain any generated particles. A like seal 159 may be provided between the second slide member 106 and the body 102.

Riser 135 may be coupled to the base 264 or elsewhere on the body 102, such as by fasteners (e.g., by bolts, screws, or the like). Base 264 may include an aperture 265 formed therein that may be configured and adapted to allow first line 268 and second line 270, such as electrical cables, or air or hydraulic lines from the first and second actuators 246, 248 (depending on whether electrical, pneumatic, or hydraulic) to pass through into a access chamber 472 (FIG. 4A) that may be formed in the riser 135.

First and second lines 268, 270 may connect to a fluid supply (not shown) to provide a pressurized fluid or a driver (not shown) to provide electric power to the first and second actuators 246, 248, depending on whether the actuators are pneumatic, hydraulic, or electrical. Additional lines may be provided for position sensors (not shown) that are configured to sense opening and closing. A plate 274 may cover the access chamber 472 and allow access to first and second connectors 276, 278 in order to allow a quick connect/disconnect of the substrate gripper apparatus 100 to and from the riser 135.

Figure 4B:
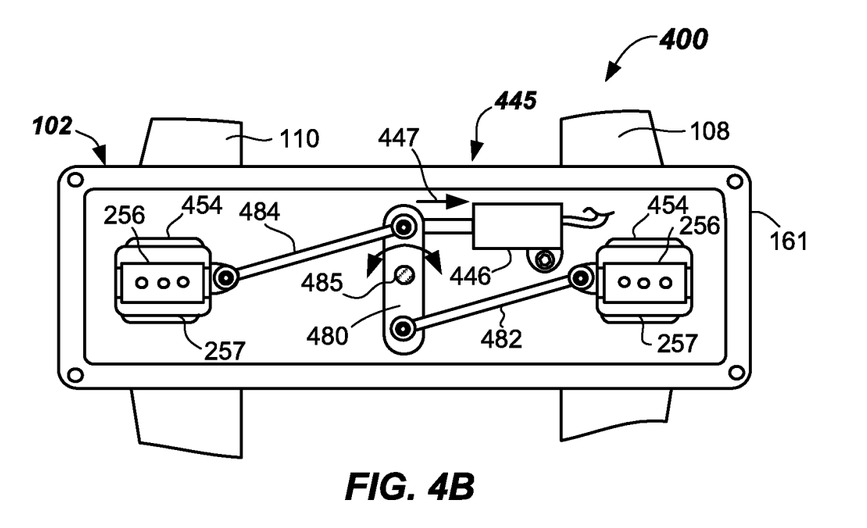
FIG. 4B illustrates a rear view (with base removed) of an alternative substrate gripper apparatus illustrating an alternative actuation assembly according to one or more embodiments.

FIG. 4B illustrates a partial rear view of an optional embodiment of an actuation assembly 445 that may be used to accomplish the open and close motion of the substrate gripper apparatus 400. The other components are the same as described with reference to FIGS. 1-4A. In the depicted embodiment of FIG. 4B, a single actuator (e.g., actuator 446) may be used to actuate the bearing components 257, and, thus, move the first slide member 104 and second slide member 106. Actuator 446 may be coupled to a pivoting link 480 along with first and second linkages 482, 484. Pivoting link 480 is configured to freely pivot about a pivot 485 on the base 264. In operation, actuation of the actuator 446 in the direction of arrow 447 causes closure, that is, movement of the bearing components 257 (and the first and second slide members 104, 106) towards each other. Actuation in the opposite direction causes opening, i.e., movement of the first slide member 104 and second slide member 106 away from each other.

Spring biasing may be provided in some embodiments (not shown) to bias the first and second finger mounting members 108, 110 to a normally-opened orientation, or even a normally-closed orientation, as desired. For example, a spring (not shown) may be mounted to either side of the pivoting link 480 and also to the base 264.

Figure 4C:
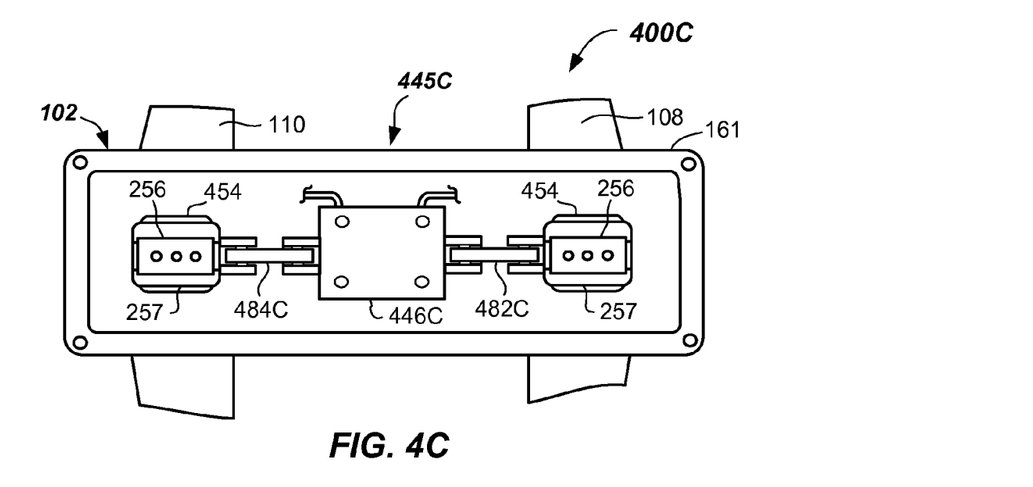
FIG. 4C illustrates a rear view (with base removed) of another alternative substrate gripper apparatus according to one or more embodiments.

In another actuation assembly option for the substrate gripper apparatus 400C, as shown in FIG. 4C, a actuator 446C (e.g., a single actuator) is used. In this configuration, actuation assembly 445C may include first and second linkages 482C, 484C coupled between the frontal members 454 and the actuator 446C, respectively. Actuator 446C may be coupled to the base 264 (removed in FIG. 4C for clarity) by fasteners (e.g., bolts, screws, or the like). Direct actuation of actuator 446C causes motion of the frontal members 454 towards and away from each, and thus motion of the first and second sliding members 104, 106 towards and away from one another. Actuator 446C may be a dual-acting actuator (e.g., a dual acting pneumatic actuator), for example. Each side of the actuator 446C may be operated in synchronism.

Figure 5:
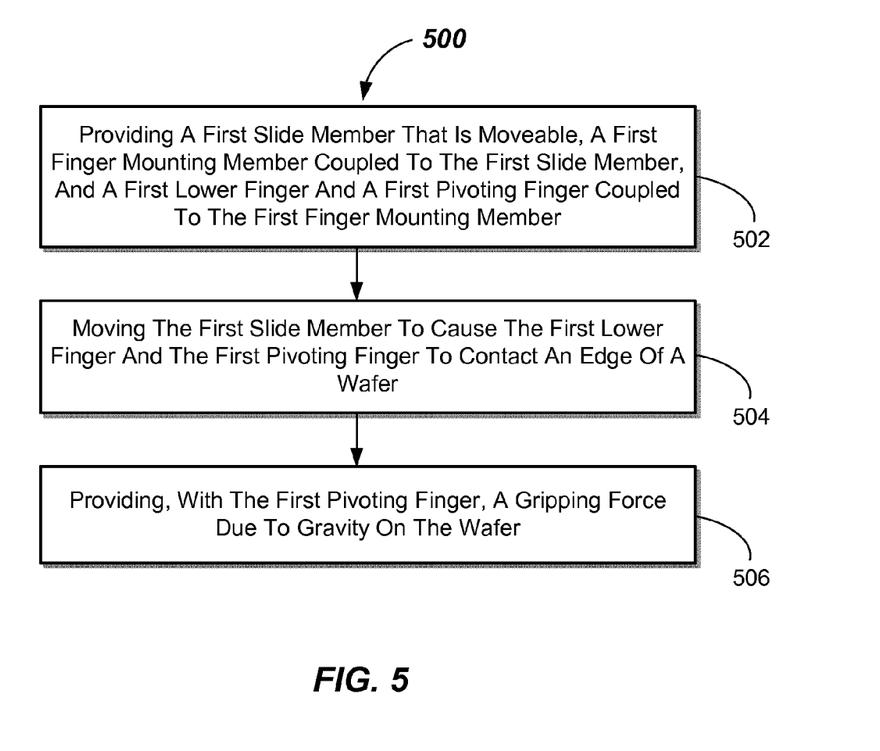
FIG. 5 illustrates a flowchart of a method of operating a substrate gripper apparatus according to one or more embodiments.

In yet another aspect, a method of operating a substrate gripper apparatus (e.g., substrate gripper apparatus 100, 400, 400C) is provided. The method 500 includes, in 502, providing a first slide member (e.g., first slide member 104) that is moveable (e.g., linearly), a first finger mounting member (e.g., first finger mounting member 108) coupled to the first slide member (e.g., first slide member 104), and a first lower finger (e.g., first lower finger 112) and a first pivoting finger (e.g., first pivoting finger 116) coupled to the first finger mounting member (e.g., first finger mounting member 108).

The method 500 includes, in 504, moving the first slide member (e.g., first slide member 104) to cause the first lower finger (e.g., first lower finger 112) and the first pivoting finger (e.g., first pivoting finger 116) to contact an edge (e.g., radial edge 121E) of a substrate (e.g., substrate 121).

The method 500 includes, in 506, providing, with the first pivoting finger (e.g., first pivoting finger 116), a gripping force due to gravity on the substrate (e.g., on substrate 121).

While the present invention has been disclosed in connection with the preferred embodiments thereof, it should be understood that other embodiments may fall within the scope of the invention, as defined by the following claims. For example, although the substrate gripper apparatus 100, 400 described herein have a first slide member 104 and a second slide member 106 that are moveable relative to the body 102, the invention will also work if one side of the substrate gripper were to be fixed, and thus only the first slide member 104 or only the second slide member 106 may be moveable.

The invention claimed is:

1. A substrate gripper apparatus, comprising:
   a body;
   a first slide member moveable relative to the body;
   a first finger mounting member coupled to the first slide member;
   a first lower finger coupled to the first finger mounting member; and
   a first pivoting finger coupled to the first finger mounting member
   wherein the first pivoting finger comprises a surface support feature configured and adapted to receive and support a planar surface of a substrate, and an edge support feature configured and adapted to contact and support an edge surface of the substrate.

2. The substrate gripper apparatus of claim 1, wherein the first slide member is moveable by an actuator.

3. The substrate gripper apparatus of claim 1, wherein the first pivoting finger comprises a rotational axis and the surface support feature and edge support feature are offset from the rotational axis.

4. The substrate gripper apparatus of claim 1, wherein the first pivoting finger comprises a first finger pivot arm extending from a first rotational axis, the surface support feature coupled to the first finger pivot arm, and the edge support feature extending from the surface support feature.

5. The substrate gripper apparatus of claim 4, wherein the surface support feature comprises a planar surface configured to support the planar surface of a substrate.

6. The substrate gripper apparatus of claim 4, wherein the edge support feature comprises a cylindrical surface configured to support the radial edge of a substrate.

7. The substrate gripper apparatus of claim 1, wherein when the substrate gripper apparatus is positioned in an upright configuration, the first pivoting finger supplies a downward force due to gravity on a substrate.

8. The substrate gripper apparatus of claim 1, comprising:
   a second slide member;
   a second finger mounting member coupled to the second slide member;
   a second lower finger coupled to the second finger mounting member; and
   a second pivoting finger coupled to the second finger mounting member.

9. The substrate gripper apparatus of claim 1, wherein the body comprises a base and a cover, and an actuator is coupled to the first slide member and housed in a chamber formed by the base and the cover.

10. A substrate gripper apparatus, comprising:
    a body;
    first slide member and second slide member moveable towards and away from each other;
    a first finger mounting member coupled to the first slide member;
    a second finger mounting member coupled to the second slide member;
    a first lower finger coupled to a lower end of the first finger mounting member;
    a second lower finger coupled to a lower end of the second finger mounting member;
    a first pivoting finger coupled to an upper end of the first finger mounting member and pivotable about a first pivot axis, the first pivoting finger including surface support features and edge support features; and
    a second pivoting finger coupled to an upper end of the second finger mounting member and pivotable about a second pivot axis, the second pivoting finger also including surface support features and edge support features.

11. The substrate gripper apparatus of claim 10, wherein the first pivoting finger and the second pivoting finger extend towards each other from the first pivot axis and the second pivot axis, respectively.

12. The substrate gripper apparatus of claim 10 wherein the first lower finger and the second lower finger are configured with surface support surfaces adapted to support a planar surface of a substrate.

13. The substrate gripper apparatus of claim 10 wherein the first lower finger and the second lower finger are configured with edge support surfaces adapted to contact and support a radial edge of a substrate.

14. The substrate gripper apparatus of claim 10, comprising an actuation assembly coupled to the first slide member and second slide member.

15. A method of operating a substrate gripper apparatus, comprising:
    providing a first slide member that is moveable, a first finger mounting member coupled to the first slide member, and a first lower finger and a first pivoting finger coupled to the first finger mounting member wherein the first pivoting finger comprises a surface support feature configured and adapted to receive and support a planar surface of a substrate, and an edge support feature configured and adapted to contact and support an edge surface of the substrate;
    moving the first slide member to cause the first lower finger and the edge support feature of the first pivoting finger to contact an edge of a substrate; and
    providing, with the first pivoting finger, a gripping force due to gravity on the substrate.

16. The method of claim 15, comprising supporting a substrate on support surfaces of the first lower finger and the surface support feature of the first pivoting finger when in a horizontal orientation.

17. The method of claim 15, comprising supporting the substrate in a vertical orientation.

18. The method of claim 15, comprising:
providing a second slide member, a second finger mounting member coupled to the second slide member, and a second lower finger and a second pivoting finger coupled to the second finger mounting member; and
moving the second slide member relative to the first slide member to close the substrate gripper apparatus.

19. The method of claim 18, comprising:
providing, with the second pivoting finger, a gripping force due to gravity on the substrate.

\* \* \* \* \*